(12) United States Patent
Dubey

(10) Patent No.: US 10,019,304 B2
(45) Date of Patent: Jul. 10, 2018

(54) PROVIDING AN APPLICATION INTERFACE PROGRAMMING EXCEPTION IN AN UPPER MANAGEMENT LAYER

(71) Applicant: NICIRA, INC., Palo Alto, CA (US)

(72) Inventor: Ankur Dubey, San Jose, CA (US)

(73) Assignee: Nicira, Inc., Palo Alto, CA (US)

( * ) Notice: Subject to any disclaimer, the term of this patent is extended or adjusted under 35 U.S.C. 154(b) by 88 days.

(21) Appl. No.: 14/989,037

(22) Filed: Jan. 6, 2016

(65) Prior Publication Data

US 2017/0192832 A1    Jul. 6, 2017

(51) Int. Cl.
*G06F 11/00* (2006.01)
*G06F 11/07* (2006.01)

(52) U.S. Cl.
CPC ........ *G06F 11/079* (2013.01); *G06F 11/0706* (2013.01); *G06F 11/0751* (2013.01)

(58) Field of Classification Search
CPC ...................................................... G06F 11/079

USPC ........................................... 714/34, 4.1, 38.1
See application file for complete search history.

(56) References Cited

U.S. PATENT DOCUMENTS

| | | | | |
|---|---|---|---|---|
| 7,882,209 B1* | 2/2011 | Eslambolchi | ............. | G06F 9/54 370/256 |
| 2007/0256055 A1* | 11/2007 | Herscu | ...................... | G06F 8/51 717/115 |
| 2013/0235795 A1* | 9/2013 | Huang | .................. | H04W 28/18 370/328 |
| 2014/0059155 A1* | 2/2014 | Boucher | ................... | G06F 5/10 709/212 |
| 2014/0109111 A1* | 4/2014 | Gupta | ................. | G06F 11/0766 719/318 |

* cited by examiner

*Primary Examiner* — Dieu-Minh Le

(57) ABSTRACT

An input string, which includes exception data payload, is received at the API exception that resides in the upper management layer. The API exception is dedicated to receiving the exception data payloads. The API exception validates the input string. The API exception transmits the exception data payload to a lower management layer without the lower management layer knowing where the exception data payload was transmitted from.

20 Claims, 6 Drawing Sheets

PROVIDING AN APPLICATION INTERFACE PROGRAMMING EXCEPTION IN AN UPPER MANAGEMENT LAYER

BACKGROUND

Various products can provide management layers that customer workloads can use in setting up configurations for computing, storage or the network, programming products or providing a hyper converged infrastructure, or a combination thereof. The management layers can include more than one layer. For example, FIG. 1 depicts a block diagram of a computer system 100, according to one embodiment. The computer system 100 includes an upper management layer 110, a lower management layer 120, and a layer 130 for configuring computing, storage or network (also referred to herein as "compute/storage/network configuration layer"), according to one embodiment. The upper management layer is referred to as being "south bound" with respect to the customer workload, the lower management layer is also "south bound" with respect to the upper management layer, and the compute/storage/network configuration layer is "south bound" with respect to the lower management layer. Therefore, the upper management layer, the lower management layer and the compute/storage/network configuration layer are referred to as "south bound software."

Examples of an upper management layer are vRealize, EVO:RAIL, and EVO:RACK. An example of a lower management layer is a virtualized network platform, such as NSX® manager. Examples of hyper-converged infrastructure appliances and virtualized network platform products that can be programmed using south bound software are NSX®, virtual storage area network (vSAN), EVO:RAIL and EVO:RACK.

BRIEF DESCRIPTION OF THE DRAWING

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale. Herein, like items are labeled with like item numbers.

DESCRIPTION OF EMBODIMENTS

Notation and Nomenclature

Figure 1:
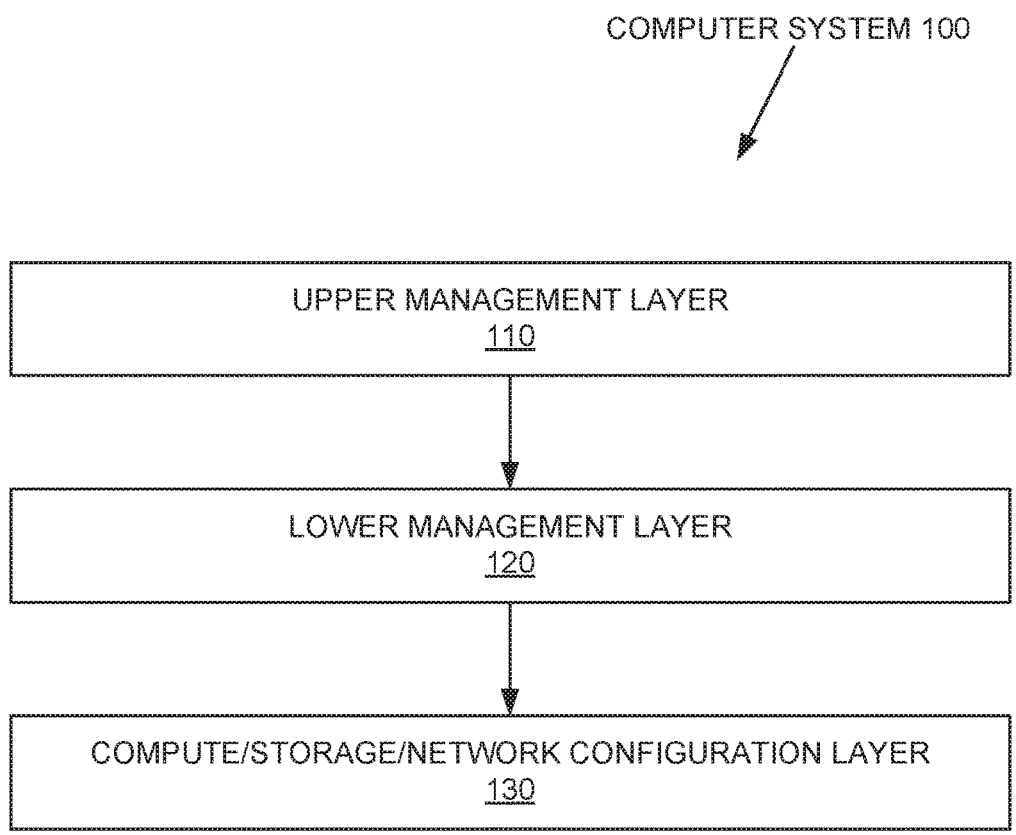
FIG. 1 depicts a block diagram of a computer system, according to one embodiment.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Unless specifically stated otherwise as apparent from the following discussions, it is appreciated that throughout the description of embodiments, discussions utilizing terms such as "receiving," "validating," "transmitting," "providing," "validating," "determining," "installing," "processing," "storing," "communicating," "causing," "transforming data," "modifying data to transform the state of a computer system," or the like, refer to the actions and processes of a computer system, data storage system, storage system controller, microcontroller, hardware processor, such as a central processing unit (CPU), or similar electronic computing device or combination of such electronic computing devices. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices.

Overview

One way of fixing bugs in an upper management layer 110, is to use the lower management layer 120 to communicate a fix up into the upper management layer 110. More specifically, a lower management layer 120 can invoke an upper management layer 110 through various application programming interfaces to install a fix onto the upper management layer 110.

However, this method of fixing bugs will not work when the workflows of south bound products are not what is expected. For example, the customer workload may not be properly designed to perform configuration operations. More specifically, the customer workload may not invoke the upper management layer that is typically expected to invoke a particular lower management layer. In this case, the expected lower management layer is never invoked. In another example, the customer workload may not properly interface with the upper management layer resulting in the upper management layer not properly interfacing with the lower management layer. Further, the customer workload may not interface with the lower management layer at all resulting in the compute/storage/network configuration layer not being invoked.

Figure 2:
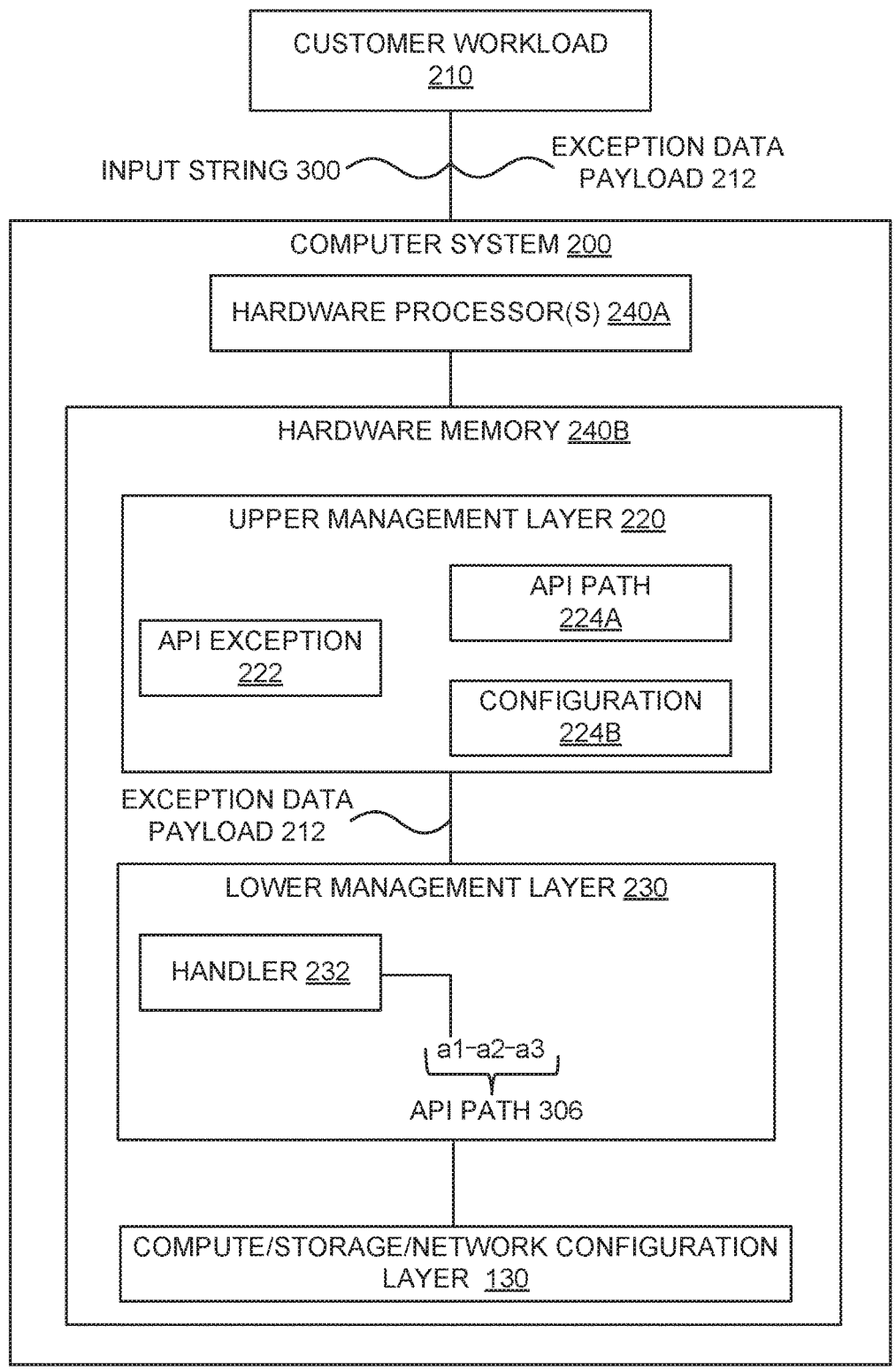
FIG. 2 depicts a block diagram of a computer system, according to one embodiment.

Computer System for Providing an Application Programming Interface Exception FIG. 2 depicts a block diagram of a system, according to one embodiment.

For example, the system depicted in FIG. 2 includes a customer workload 210 and a computer system 200. The computer system 200 includes one or more hardware processors 240A and hardware memory 240B. The hardware memory 240B includes an upper management layer 220, a lower management layer 230 and a compute/storage/network configuration layer 130 (also referred to herein as the "configuration layer"), according to one embodiment. Embodiments are well suited to more than one hardware memory 240B where a hardware memory stores one or more of the logics 220, 230, 130. According to one embodiment, the one or more hardware processors 240A execute the upper management layer 220, the lower management layer 230 and the compute/storage/network configuration layer 130. In so doing, the upper management layer 220, the lower management layer 230 and the compute/storage/network configuration layer 130 operate on the one or more hardware processors 240A, for example, by providing the one or more hardware processors 240A with instructions that the hardware processor(s) 240A execute.

An example of an upper management layer 220 is a hyper-converged infrastructure appliance, such as any one of EVO:RAIL, EVO:RACK or a cloud management platform such, as vRealize. However, embodiments are well suited to other upper management layers. An example of a lower management layer 230 is a virtualized network platform, such as NSX® manager. However, embodiments are well suited to other lower management layers.

The upper management layer 220 includes an API exception 222. The lower management layer includes a handler 232 and application programming interfaces a1, a2, a3 that form an API path 306. For example, a1 may invoke a2 which in turn invokes a3 which then invokes the compute/storage/network configuration layer 130.

The customer workload 210, according to one embodiment, can invoke the API exception 222 with exception data payload 212 and an input string 300 that includes a lower management layer identification, a lower management layer location designator, an API path, and an API configuration. An example of a lower management layer location designator is an IP address. For example, if the lower management layer is NSX® manager, then the lower management layer identification can be the name NSX® manager or a unique identifier for NSX® manager, the lower management layer location designator can be the IP address of the NSX® manager. The lower management layer 230 can use the API configuration in the input string 300 to configure the configuration layer 130. The API configuration in the input string 300 may be for configuring one or more of compute, storage and a network. If the configuration layer 130 is properly configured with the API configuration from the input string 300, according to one embodiment, the configuration layer 130 will return an indication that the configuration was performed successfully. Otherwise, the returned indication will specify that an error occurred and may provide information pertaining to the type of error that occurred.

If the returned indication specifies that the configuration was performed successfully, then the upper management layer 220 can perform a look up to determine if that particular exception API 222 had been performed before. For example, the API path in the input string 300 can be used to determine if that exception API 222 had been performed before or not. If this is the first time that the API exception 222 has been performed, then the upper management layer 220 can save the API path and the API configuration respectively as API path 224A and configuration 224B in the upper management layer 220.

An API exception 222, as discussed herein, provides a quick way of addressing problems without waiting for a new release of the product(s) that includes the upper management layer, the lower management layer and/or the compute/storage/network configuration layer.

Inputs

The inputs to the upper management layer include the input string 300. According to one embodiment, the input string 300 can include exception data payload 212 or the exception data payload 212 can be separate from the input string 300. According to one embodiment, the inputs 300 and 212 are part of a request from the customer workload 210 for performing an operation, such as setting up configurations for computing, storage or the network, programming products or providing a hyper converged infrastructure, or a combination thereof.

Figure 3:
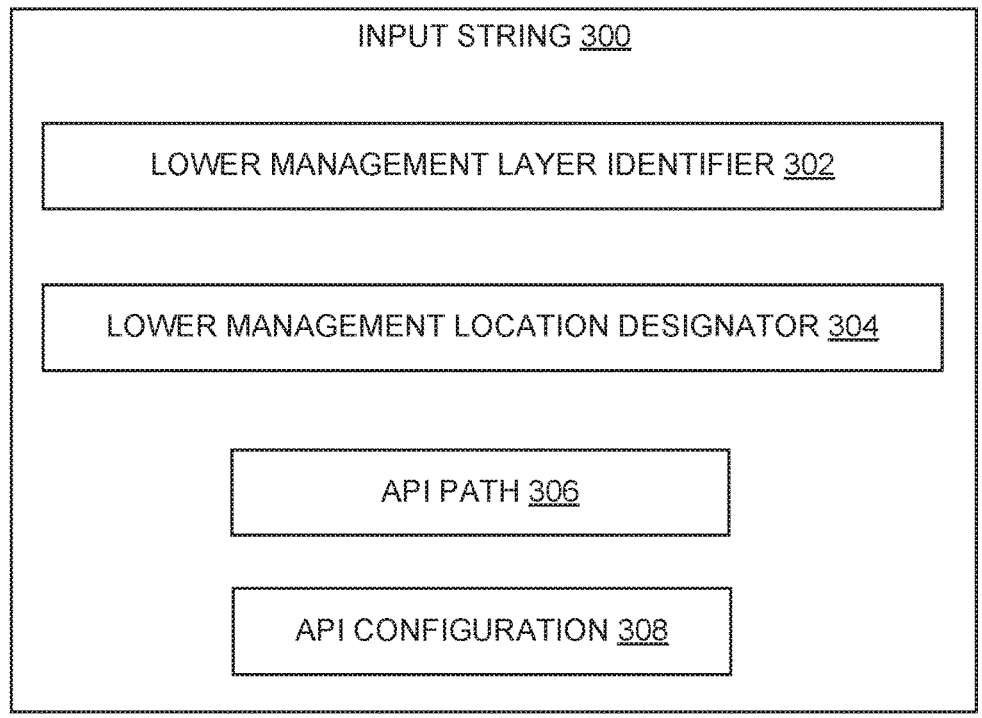
FIG. 3 depicts a block diagram of an input string, according to one embodiment.

FIG. 3 depicts a block diagram of an input string 300, according to one embodiment. As depicted, the input string 300 includes a lower management layer identifier 302, a lower management layer location designator 304, an API path 306, and an API configuration 308.

For example, assuming that the lower management layer is the NSX® manager, then the lower management layer identifier 302 could be the name NSX® manager or a unique number that is only assigned to this lower management layer 230. Following this example, the lower management layer location designator 304 could be the IP address of the NSX® manager, the API path 306 could specify a1, a2, a3, as discussed herein, and the API configuration 308 could be a JavaScript Object Notation (JSON) file containing the configuration for a compute configuration, a storage configuration or a network configuration or a combination thereof.

Since the input string 300 includes the API path 306, the upper management layer 220, according to one embodiment, is not aware (also referred to as being "agnostic") of the data paths that are used for processing the exception. More specifically, the upper management layer 220 is not aware that the data path of a1 to a2 to a3, as depicted in FIG. 2, will be used for processing the customer workload 210's request. According to one embodiment, the upper management layer 220 can be agnostic about the data paths because the input string 300 includes the API path 306.

According to one embodiment, the upper management layer 220 does not process the exception data payload 212. For example, the upper management layer 220, which includes the API exception 222, does not look at or modify the exception data payload 212. Instead the lower management layer 230 processes the exception data payload 212, according to one embodiment. For example, the application program interfaces specified in the API path 306 process the exception data payload 212. Various data in the exception data payload 212 can be used as inputs to the application program interfaces specified in the API path 306.

Multiple Upper Management Layers or Lower Management Layers

Figure 4:
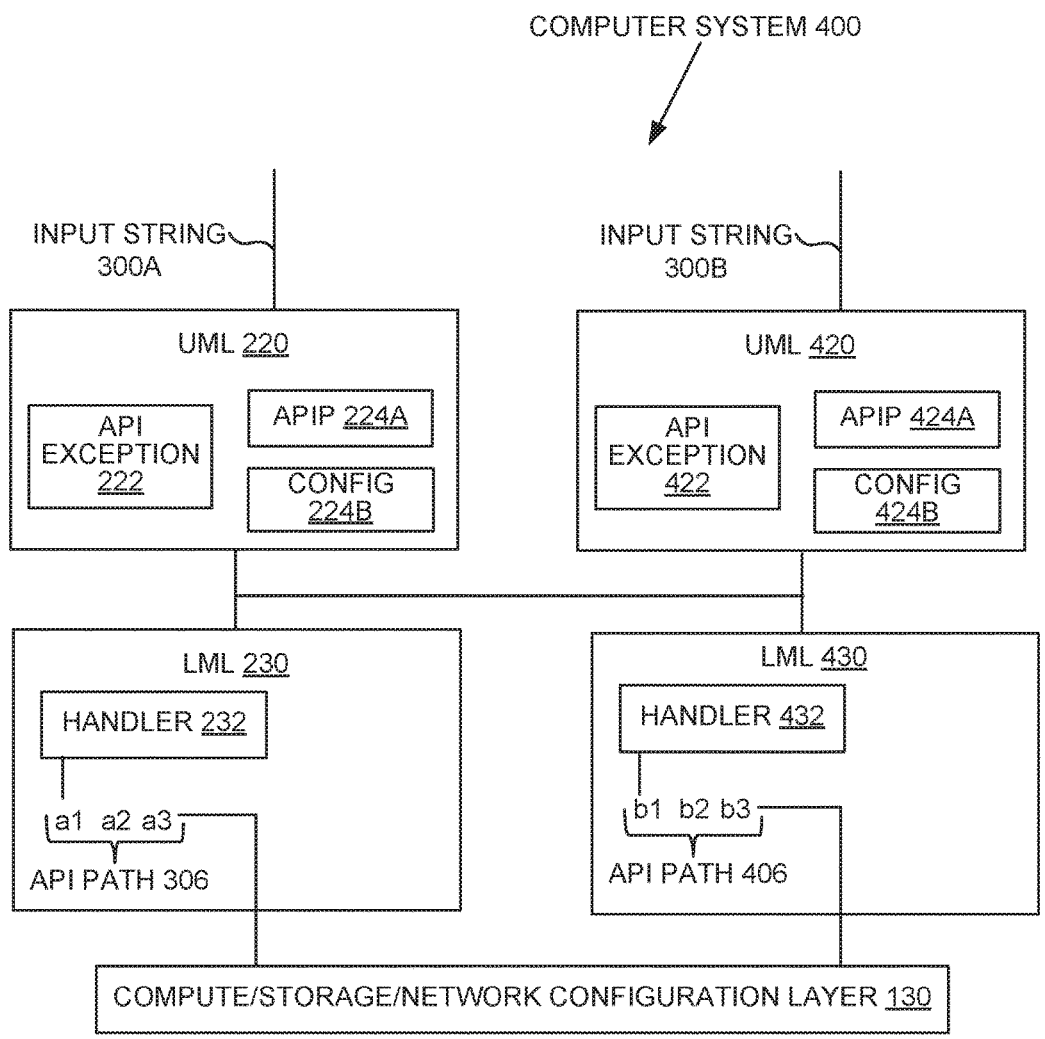
FIG. 4 depicts a block diagram of a computer system with multiple upper management layers and multiple lower management layers, according to one embodiment.

Various embodiments are well suited to two or more upper management layers and two or more lower management layers. FIG. 4 depicts a block diagram of a computer system 400 with multiple upper management layers and multiple lower management layers, according to one embodiment.

As depicted in FIG. 4, the computer system 400 includes two upper management layers 220, 420, two lower management layer 230, 430 and the compute/storage/network configuration layer 130. Both of the upper management layers 220, 420 can communicate either or both of the lower management layers 230, 430 and vice versa. The lower management layers 230, 430 communicate with the compute/storage/network configuration layer 130. One or more customer workloads can communicate with either or both of the upper management layers 220, 420.

Each of the upper management layers 220, 420 have their own dedicated API exception 222, 422 and each of the lower management layers 230, 430 have their own dedicated handler 232, 432. For example, upper management layer 220 has API exception 222, upper management layer 420 has API exception 422, lower management layer 230 has handler 232 and lower management layer 430 has handler 432.

The logics 220, 420, 230, 430, and 130 may reside in one or more hardware memories 240B and the logics 220, 420, 230, 430, and 130 may be executed by one or more hardware processors 240A. The hardware memories and hardware processors may be associated with one or more physical computers.

The API exceptions 222, 422 receive respective input strings 300A and 300B and exception data payloads 212A and 212B. The API exceptions 222, 422 can be instructed to invoke either of the handlers 232, 432 in the respective lower management layers 230, 430. For example, API exception 222 can be instructed to invoke the handler 232 in lower management layer 230 by including the IP address for handler 232 in its input string 300A. The same API exception 222 can be instructed to invoke the handler 432 in the lower management layer 430 by including the IP address for handler 432 in its input string 300A. Similarly, API exception 422 can be instructed to invoke the handler 232 based on an IP address for handler 232 in its input string 300B or to invoke the handler 432 based on an IP address for handler 432 in its input string 300B.

Further, if the lower management layer location designator 304 for an input string 300A, 300B is the IP address of handler 232, then according to one embodiment, the API path 306 could be a1, a2, and a3. If the lower management layer location designator 304 for an input string 300A, 300B is the IP address of handler 432, then according to one embodiment, the API path 306 could be b1, b2, and b3.

The exception data payload 212, 212A, 212B, is simply data, and the type of data that makes up the exception data payload 212, 212A, 212B depends on the nature of the lower management layer 230, 430 for which it is destined. For example, lower management layer 230 has logic that is capable of validating and processing exception data payload 212A, 212B when the respective input string 300A, 300B has an IP address for handler 232 and lower management layer 430 has logic that is capable of validating and processing exception data payload 212A, 212B when the respective input string 300A, 300B has an IP address for handler 432.

The blocks that represent features in FIGS. 2 and 4 can be arranged differently than as illustrated, and can implement additional or fewer features than what are described herein. Further, the features represented by the blocks in FIGS. 2 and 4 can be combined in various ways. The computer systems 200 and 400 can be implemented using software, hardware, hardware and software, hardware and firmware, or a combination thereof. Further, unless specified otherwise, various embodiments that are described as being a part of the computer systems 200 and 400, whether depicted as a part of the computer systems 200 and 400 or not, can be implemented using software, hardware, hardware and software, hardware and firmware, or a combination thereof.

Figure 5:
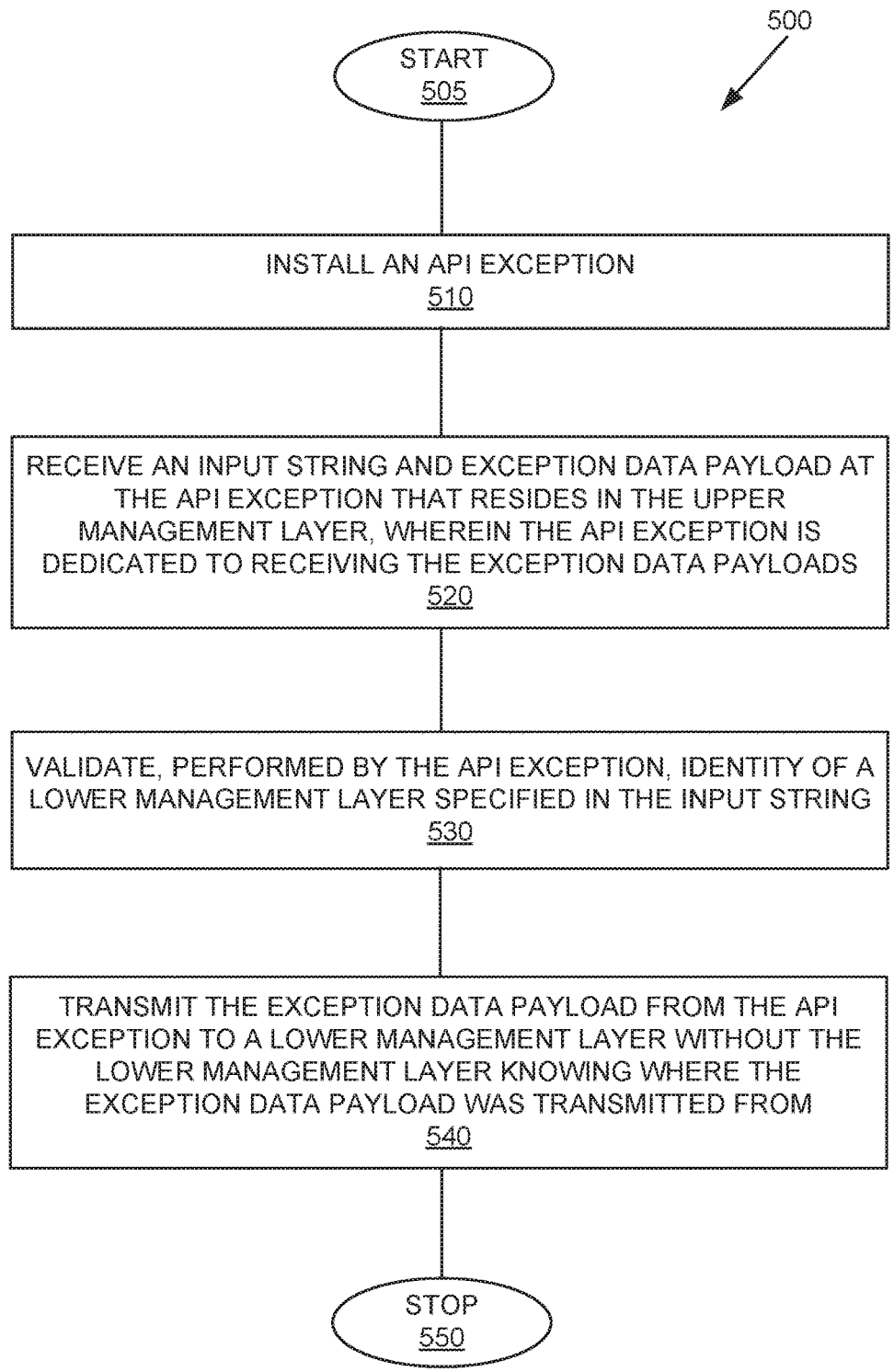
FIG. 5 depicts a flow chart of a method providing an application programming interface (API) exception in an upper management layer, according to one embodiment.

Illustration of a Method Providing an Application Programming Interface Exception FIG. 5 depicts a flow chart 500 of a method providing an application programming interface (API) exception in an upper management layer, according to one embodiment.

For this illustration, assume that the customer workload 210 requests a configuration operation with the assistance of various management layers, as discussed herein. Further, for this illustration, assume that there is a bug in the computer system 200 and a conventional fix to the bug will not work because the workflows of south bound products, such as the upper management layer 220 and/or the lower management layer 230, are not what is expected, as discussed herein. Therefore, in order to successfully perform the requested configuration operation, an API exception is installed on the upper management layer 220.

At 505, the method begins.

At 510, an API exception is installed. The installation of the API exception 222 can be performed by installing a software upgrade, such as a patch, without requiring a new release of the product(s) that include the upper management layer 220, the lower management layer 230, and/or the compute/storage/network configuration layer 130. According to one embodiment, an API exception 222 is added to an existing upper management layer 220. According to another embodiment, an entirely new upper management layer 220 that includes the API exception 222 is installed. In a similar manner, a handler 232 can be installed in a lower management layer 230.

An API exception 222, as discussed herein, provides a quick way of addressing problems without requiring a wait for a new release of the product(s) that includes the upper management layer, the lower management layer and/or the compute/storage/network configuration layer.

According to one embodiment, the installation of the API exception 222 and the handler 232 makes a system as depicted in FIG. 1 into a system as depicted in FIG. 2.

At 520, an input string 300 and the exception data payload 212 are received at the API exception 222 that resides in the upper management layer 220.

For example, the customer workload 210 can request that a configuration operation be performed by invoking the application programming interface (API) exception 222 that resides in the upper management layer 220 with an input string 300 and exception data payload 212. The input string 300 includes a lower management layer identifier 302, lower management layer location designator 304, an API path 306 relevant to the lower management layer 230, and an API configuration 308, such as compute configuration, storage configuration, or network configuration, or a combination thereof, for a product such as NSX®, vSAN, EVO rail and EVO rack.

The API exception 222, 422 is dedicated to receiving the exception data payloads 212. For example, referring to FIG. 4, each of the upper management layers 220, 420 have their own dedicated API exception 222, 422 and each of the lower management layers 230, 430 have their own dedicated handler 232, 432. More specifically referring to FIG. 4, upper management layer 220 has API exception 222, upper management layer 420 has API exception 422, lower management layer 230 has handler 232 and lower management layer 430 has handler 432.

At 530, an identity of the lower management layer 230 specified in the input string 300 is validated by the API exception 222.

For example, the API exception 222 validates that the lower management layer location designator 304 is the proper lower management location designator of the specified lower management layer 230. More specifically, if the lower management location designator 304 is an IP address and the lower management layer designator 304 specifies the NSX® manager, then the API exception 222 may validate that the IP address is the actual IP address of the NSX® manager. The API exception, 222 according to one embodiment, determines which lower management layer 230 to communicate with based on the lower management layer location designator 304 in the input string 300.

According to one embodiment, the upper management layer 220, which includes the API exception 222, does not validate the API path 306. According to one embodiment, the upper management layer 220, which includes the API exception 222, does not process the exception data payload 212. For example, the upper management layer 220 does not look at or modify the exception data payload 212, it is dedicated only to receiving the input string 300 with the exception data payload 212 and routing the exception data payload 212 to the proper handler (e.g., 232, 242) as specified by the input string 300.

At 540, the API exception 222 transmits the exception data payload 212 to a handler 232 in a lower management layer 230 without the lower management layer 230 knowing where the exception data payload 212 was transmitted from.

Since the upper management layer 220 uses a lower management layer location designator 304, such as an IP address, to determine which lower management layer 230 to invoke, there is no reason for the lower management layer 230 to have knowledge of what entity invoked the lower management layer 230. More specifically, the exception data payload 212, the API path 306 and the API configuration 308 are transmitted to the handler 232 without the lower management layer 230 knowing where the exception data payload 212, the API path 306 and the API configuration 308 were transmitted from because the lower management layer 230, according to various embodiments, accepts those inputs 306, 308 without investigation.

The API exception 222 can use the validated IP address (e.g., lower management location designator 304) to communicate the API path 306, the API configuration 308 and the exception data payload 212 to the handler 232 that resides in the lower management layer 230. The handler 232 can use the API path 306 to determine what APIs in the lower management layer 230 to invoke and the order to invoke those APIs as a part of performing the requested configuration operation using the API configuration 308 and the exception data payload 212. For example, assume for the sake of illustration, that the API path 306 from the input string 300 designates invoking a1, then a2, and then a3. In this case, a1 (see FIG. 2) will be invoked first, a1 will invoke a2, a2 will invoke a3 and a3 will invoke the compute/storage/network configuration layer 130. The lower management layer 230 can validate the exception data payload 212 as a part of performing the configuration operation. Various parts of the exception data payload 212 can be used as inputs to a1, a2, and a3 (see FIG. 2).

The lower management layer 230 can use the API configuration 308 in the input string 300 to configure the configuration layer 130. The API configuration 308 in the input string 300 may be for configuring one or more of compute, storage or a network in the configuration layer 130. If the configuration layer 130 is properly configured with the API configuration 308 from the input string 300, according to one embodiment, the configuration layer 130 will return an indication that the configuration was performed successfully. Otherwise, the configuration layer 130 can return an indication that the configuration was not successful. In this case, the indication may include a type of error that occurred. The indication can also be referred to as the "status" of the execution of the configuration operation.

If the returned indication specifies that the configuration was performed successfully, then the upper management layer 220 can perform a look up to determine if that particular exception API 222 had been performed before. For example, the API path 306 in the input string 300 can be used to determine if that exception API 222 had been performed before or not. If this is the first time that the API exception 222 has been performed, then the upper management layer 220 can save the API path 306 and the API configuration 308 in the input string 300 respectively as API path 224A and configuration 224B in the upper management layer 220 so that the API path and API configuration will persist, for example, across reboots of any of the physical computers in the computer system 200.

At 550, the method ends.

According to one embodiment, the API exception 222 performs 510-540.

Figure 6:
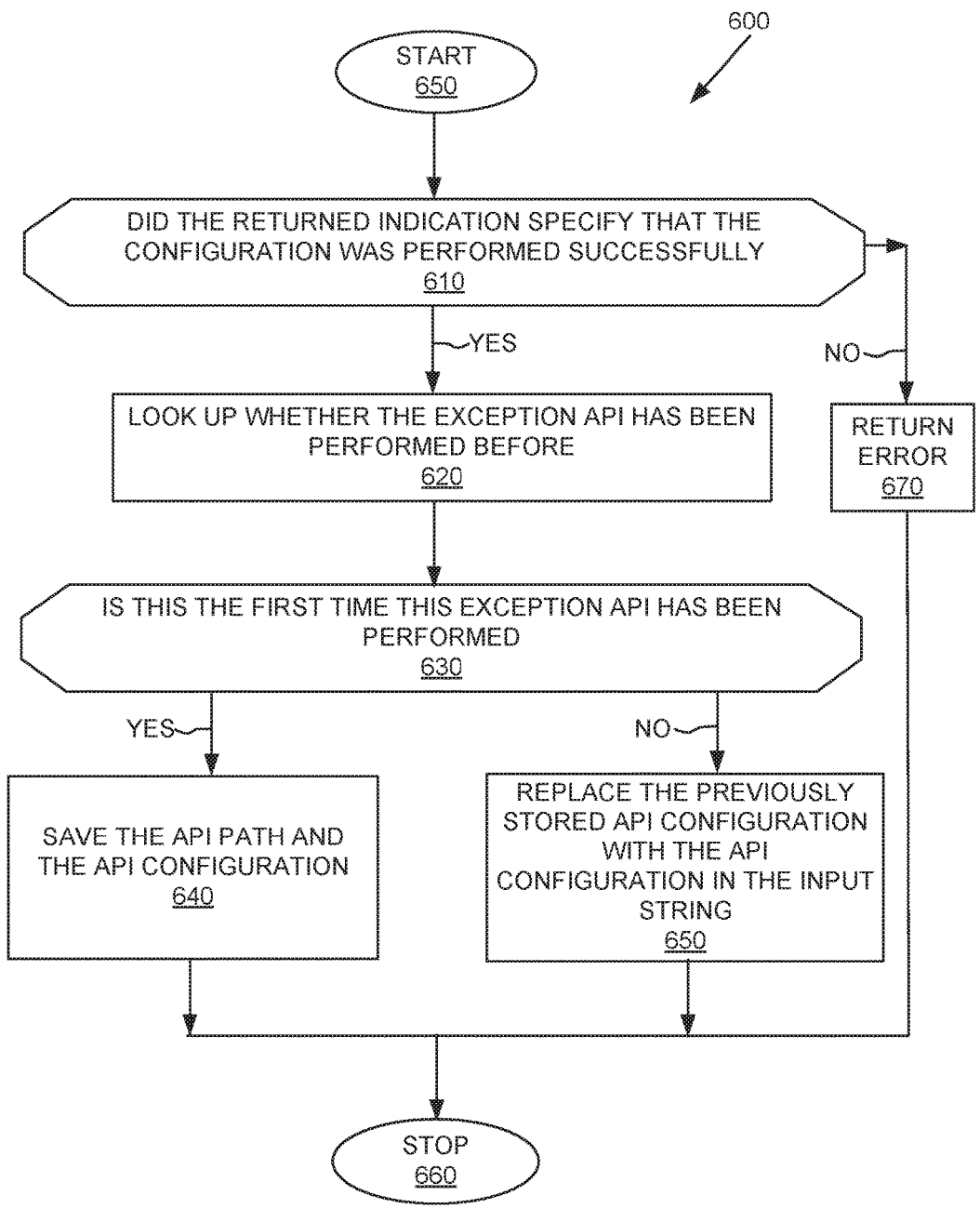
FIG. 6 depicts a flow chart of a method of providing an application programming interface exception in an upper management layer, according to another embodiment.

FIG. 6 depicts a flow chart 600 of a method of providing an application programming interface exception in an upper management layer, according to another embodiment.

Operations 510-540, according to one embodiment, are performed in preparation for method 600 to begin at 605.

At 605, the method 600 begins.

At 610, a determination is made as to whether the returned indication specifies that the configuration was performed successfully. If the returned indication specifies that the configuration was performed successfully, processing proceeds to 620. Otherwise, it proceeds to 670.

At 620, the upper management layer 220 can perform a look up to determine if that particular exception API 222 had been performed before. Processing proceeds to 630.

At 630, a determination is made as to whether this is the first time this particular exception API 222 has been performed based on the look up performed in 620. For example, the API path 306 in the input string 300 can be used to determine if that exception API 222 had been performed before or not. If this is the first time that the API exception 222 has been performed, then processing can proceed to 640. Otherwise, processing can proceed to 650.

At 640, the upper management layer 220 can save the API path 306 and the API configuration 308 in the input string 300 respectively as API path 224A and configuration 224B in hardware memory of the upper management layer 220 so that the API path and API configuration will persist, for example, across reboots of any of the physical computers in the computer system 200. According to one embodiment, the API path 224A and the configuration 224B are mapped to each other and the mapping between them is also saved in hardware memory. The processing proceeds to 660.

At 650, the previously stored API configuration 224B is replaced with the API configuration 308 in the input string 300. Processing proceeds to 660.

At 670, an error is returned to the entity that invoked the API exception 222. For example, an error can be returned to the customer workload 210.

At 660, processing ends.

According to one embodiment, the API exception 222 performs 510-540 and 605-660. Although various embodiments of flowcharts 500 and 600 were described in the context of FIG. 2, various embodiments described in the context of flowcharts 500 and 600 are also well suited for the computer system 400 depicted in FIG. 4.

The above illustration is only provided by way of example and not by way of limitation. There are other ways of performing the method described by flowcharts 500 and 600.

Although flowcharts 500 and 600 were discussed in the context of FIG. 2, the methods of flowcharts 500 and 600 are is also well suited for embodiments using a computer system 400 as depicted in FIG. 4.

Computer Readable Storage Medium

Unless otherwise specified, any one or more of the embodiments described herein can be implemented using non-transitory computer readable storage medium and computer readable instructions which reside, for example, in computer-readable storage medium of a computer system or like device. The non-transitory computer readable storage medium can be any kind of physical memory that instructions can be stored on. Examples of the non-transitory computer readable storage medium include but are not limited to a disk, a compact disk (CD), a digital versatile device (DVD), read only memory (ROM), flash, and so on. As described above, certain processes and operations of various embodiments of the present invention are realized, in one embodiment, as a series of computer readable instructions (e.g., software program) that reside within non-transitory computer readable storage memory of a computer system and are executed by the hardware processor of the computer system or physical computer. When executed, the instructions cause a computer system (physical computer) to implement the functionality of various embodiments of the present invention. For example, the instructions can be executed by a central processing unit associated with the computer system (physical computer). A central processing unit is an example of a hardware processor. According to one embodiment, the non-transitory computer readable storage medium is tangible. The non-transitory computer readable storage medium is hardware memory.

Unless otherwise specified, one or more of the various embodiments described in the context of FIGS. 1-5 can be implemented as hardware, such as circuitry, firmware, or computer readable instructions that are stored on non-transitory computer readable storage medium. The computer readable instructions of the various embodiments described in the context of FIGS. 1-5 can be executed by a hardware processor, such as central processing unit, to cause a computer system to implement the functionality of various embodiments. For example, according to one embodiment, the operations of the flowcharts depicted in FIG. 5 are implemented with computer readable instructions that are stored on computer readable storage medium that can be tangible or non-transitory or a combination thereof.

CONCLUSION

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations and illustrations. However, any two or more embodiments or features may be combined. Further, any embodiment or feature may be used separately from any other embodiment or feature. Phrases, such as "an embodiment," "one embodiment," among others, used herein, are not necessarily referring to the same embodiment. Features, structures, or characteristics of any embodiment may be combined in any suitable manner with one or more other features, structures, or characteristics.

Although various illustrations were described in the context of VMware® products, such as NSX® manager, Vrealize, EVO rail, and EVO rack, various embodiments are well suited for other types of products where, for example, a program, such as a customer workload, communicates with the wrong upper management layer or improperly communicates with an upper management layer causing it, for example, to not communicate with a lower management layer resulting in the improper execution of a configuration operation.

According to various embodiments, an API exception provides proper communications between an upper management layer and a lower management layer where such proper communications did not exist prior to the API exception. Therefore, the state of a computer system is transformed at least by an API exception, according to one embodiment.

Although specific operations are disclosed in flowchart 500, such operations are exemplary. That is, embodiments of the present invention are well suited to performing various other operations or variations of the operations recited in flowchart 500. It is appreciated that the operations in flowchart 500 may be performed in an order different than presented, and that not all of the operations in flowchart 500 may be performed.

The operations depicted in FIG. 5 can be implemented as computer readable instructions, hardware or firmware. According to one embodiment, a computer system 200, 400 can perform one or more of the operations depicted in FIG. 5. According to one embodiment, one or more of the operations depicted in FIG. 5 may be performed by another computer system. The other system can include hardware, such as a central processing unit, for executing computer readable instructions.

The operations depicted in FIG. 5 transform data or modify data to transform the state of one or more physical computers performing computer systems 200, 400. For example, by receiving an input string and exception data payload at the API exception that resides in the upper management layer, wherein the API exception is dedicated to receiving the exception data payloads, validating, performed by the API exception, the input string, transmitting the exception data payload from the API exception to a lower management layer without the lower management layer knowing where the exception data payload was transmitted from, the state of the one or more physical computers is transformed into physical computers where the upper management layer and the lower management layer are capable of communicating.

What is claimed is:
1. A computer-implemented method of exception handling within a computer system, the computer-implemented method comprising:
receiving, at said computer system, an input string and an exception data payload at an API exception that resides in an upper management layer of a software stack of said computer system, wherein the API exception is dedicated to receiving exception data payloads within said computer system;

validating, performed by the API exception of said computer system, identity of a lower management layer of said software stack of said computer system specified in the input string, said validating performed by said computer system;

transmitting, within said computer system, the exception data payload from the API exception to the lower management layer without the lower management layer knowing where the exception data payload was transmitted from, and such that said API exception provides proper communications between said upper management layer and said lower management layer where such proper communications did not exist prior to said API exception, to provide a way of addressing problems without waiting for a new release of a product that includes said upper management layer and said lower management; and wherein the receiving, validating and transmitting are performed by one or more hardware processors of said computer system.

2. The computer-implemented method as recited by claim 1, wherein the computer-implemented method further comprises:

receiving the input string at the API exception in response to a request from a customer workload; and providing an agnostic upper management layer, within said software stack of said computer system, that is agnostic with respect to data paths that are used for processing the request from the customer workload, wherein the upper management layer is the agnostic upper management layer.

3. The computer-implemented method as recited by claim 1, wherein the computer-implemented method further comprises:

in response to receiving the exception data payload:
    validating, performed by the lower management layer of said software stack of said computer system, the exception data payload;
    determining, performed by the lower management layer, a configuration based on the exception data payload;
    configuring, performed by the lower management layer, a configuration layer based on the configuration; and
    returning, from the lower management layer, a status of the configuration to the upper management layer of said software stack of said computer system; and
    storing the configuration at the upper management layer.

4. The computer-implemented method as recited by claim 1, wherein the computer-implemented method further comprises:

determining, by said computer system, that there is a problem with one or more southbound products that include the upper management layer of said software stack of said computer system and the lower management layer of said software stack of said computer system; and installing the API exception on the upper management layer in response to the determining of the problem.

5. The computer-implemented method as recited by claim 1, wherein the computer-implemented method further comprises:

in response to the API exception receiving a second input string that specifies a second lower management layer of said network stack of said computer system, transmitting, within said computer system, a second exception data payload associated with a second input string from the API exception to a second handler of the second lower management layer.

6. The computer-implemented method as recited by claim 1, wherein the computer-implemented method further comprises:

in response to the API exception receiving a second input string that specifies a second lower management layer of said network stack of said computer system, transmitting a second exception data payload associated with a second input string from the API exception to a second handler that resides in the second lower management layer.

7. The computer-implemented method as recited by claim 1, wherein the computer-implemented method further comprises:

transmitting the exception data payload from the upper management layer of said network stack of said computer system to the lower management layer of said network stack of said computer system without processing the exception data payload at the upper management layer; and processing the exception data payload at the lower management layer.

8. A computing system comprising:

at least one hardware processor;

an upper management layer of a network stack of said computer system operating on the at least one hardware processor;

a lower management layer of said network stack of said computer system operating on the at least one hardware processor; and an API exception that resides in the upper management layer, wherein the API exception:
    receives an input string and an exception data payload, wherein the API exception is dedicated to receiving the exception data payloads;
    validates identify of a lower management layer specified in the input string; and
    transmits the exception data payload to a handler in a lower management layer without the lower management layer knowing where the exception data payload was transmitted from, and such that said API exception provides proper communications between said upper management layer and said lower management layer where such proper communications did not exist prior to said API exception, to provide a way of addressing problems without waiting for a new release of a product that includes said upper management layer and said lower management.

9. The computing system of claim 8, wherein:

in response to receiving the exception data payload, the lower management layer of said network stack of said computer system validates the exception data payload, determines, a configuration based on the exception data payload, configures a configuration layer based on the configuration, returns, from the lower management layer, a status of the configuration to the upper management layer of said network stack of said computer system; and the upper management layer stores the configuration at the upper management layer.

10. The computing system of claim 8, wherein the input string includes the identity of the lower management layer of said network stack of said computer system, a lower management layer location designator, an API path relevant to the lower management layer, and an API configuration.

11. The computing system of claim 8, wherein the computing system installs the API exception on the upper management layer of said network stack of said computer system, wherein the upper management layer was not capable of correct communications with the lower management layer of said network stack of said computer system prior to the installing of the API exception on the upper management layer.

12. The computing system of claim 8, wherein the computing system further comprises a second API exception in a second upper management layer of said network stack of said computer system, and wherein the second API exception communicates with one or more lower management layers.

13. The computing system of claim 8, wherein the upper management layer of said network stack of said computer system does not process the exception data payload and wherein the lower management layer of said network stack of said computer system does process the exception data payload.

14. The computing system of claim 8, wherein the API exception determines what lower management layer of said network stack of said computer system to communicate with based on a lower management layer location designator in the input string.

15. A non-transitory computer readable storage medium having computer readable program code embedded therein that when executed causes a computing system to perform a computer-implemented method of handling exceptions, said computer-implemented method comprising:
receiving, at an API exception in an upper management layer of a network stack of said computing system, an identification of a lower management layer of said network stack of said computing system and an exception data payload, wherein the API exception is dedicated to receiving the exception data payloads within said computing system;
validating, at the API exception, the identification of the lower management layer; and
transmitting, by the API exception, the exception data payload to a handler in the lower management layer without the lower management layer knowing where the exception data payload was transmitted from, and such that said API exception provides proper communications between said upper management layer and said lower management layer where such proper communications did not exist prior to said API exception, to provide a way of addressing problems without waiting for a new release of a product that includes said upper management layer and said lower management.

16. The non-transitory computer readable storage medium as recited by claim 15, wherein the computer-implemented method further comprises: configuration capabilities for installing the API exception on the upper management layer of said network stack of said computing system.

17. The non-transitory computer readable storage medium as recited by claim 15, wherein the receiving further comprises receiving an input string that includes the identification of the lower management layer identifier, a lower management layer location designator, an API path relevant to the lower management layer of said network stack of said computing system, and an API configuration.

18. The non-transitory computer readable storage medium as recited by claim 15, wherein the computer-implemented method further comprises:
in response to receiving the exception data payload within said computing system:
validating, performed by the lower management layer of said network stack of said computing system, the exception data payload;
determining, performed by the lower management layer, a configuration based on the exception data payload;
configuring, performed by the lower management layer, a configuration layer based on the configuration; and
returning, from the lower management layer, a status of the configuration to the upper management layer of said network stack of said computing system; and
storing the configuration at the upper management layer.

19. The non-transitory computer readable storage medium as recited by claim 15, wherein the computer-implemented method further comprises:
providing a second API exception in a second upper management layer of said network stack of said computing system, and wherein the second API exception communicates with one or more lower management layers of said network stack of said computing system.

20. The non-transitory computer readable storage medium as recited by claim 15, wherein the computer-implemented method further comprises:
executing the upper management layer of said network stack of said computing system without the upper management layer processing the exception data payload; and
processing the exception data payload at the lower management layer of said network stack of said computing system.

* * * * *